United States Patent [19]

Terry

[11] Patent Number: 4,667,134
[45] Date of Patent: May 19, 1987

[54] DEFLECTION CIRCUIT FOR A CATHODE RAY TUBE

[75] Inventor: Alan J. Terry, London, England

[73] Assignee: U.S. Philips Corporation, New York, N.Y.

[21] Appl. No.: 770,547

[22] Filed: Aug. 29, 1985

[30] Foreign Application Priority Data

Sep. 24, 1984 [GB] United Kingdom ............. 8424076

[51] Int. Cl.$^4$ .................. H01J 29/70; H01J 29/72
[52] U.S. Cl. .................................. 315/366; 313/422
[58] Field of Search ................. 315/366; 313/422; 328/186; 307/227

[56] References Cited

U.S. PATENT DOCUMENTS

| | | | |
|---|---|---|---|
| 2,961,575 | 11/1960 | Pohl | 315/366 |
| 3,171,056 | 2/1965 | Gabor | 315/366 |
| 4,121,164 | 10/1978 | Feucht | 307/228 |
| 4,129,804 | 12/1978 | Wiesbrod | 315/366 |
| 4,490,653 | 12/1984 | Olmstead | 315/403 |

Primary Examiner—Theodore M. Blum
Attorney, Agent, or Firm—Thomas A. Briody; William J. Streeter; Leroy Eason

[57] ABSTRACT

A deflection circuit having particular application to a flat cathode ray display tube in which a channel plate electron multiplier is disposed parallel to, and spaced from, a cathodoluminescent screen and a low current, low voltage electron beam is scanned over the input side of the electron multiplier by means of a variable electrostatic field created between a planar array of substantially parallel elongate electrodes and the input side of the electron multiplier. In order to generate the variable electrostatic field a deflection circuit is provided having a plurality of ramp voltages generating stages, each stage being connected to a respective elongate electrode. The deflection circuit is operated in such a manner that the completion of the generation of a ramp voltage in one stage is used to trigger the next required stage.

18 Claims, 9 Drawing Figures

| | $\overbrace{\phantom{xx}}^{\overline{Q1}}$ | | $\overline{Q2}$ | $\overline{Q3}$ | Q4 | Q5 | Q6 | Q7 |
|---|---|---|---|---|---|---|---|---|
| | 1 | 2 | 3 | 4 | 5 | 6 | 7 | 8 |
| CP1 | (1) | 1 | 1 | 1 | 0 | 0 | 0 | 0 |
|     | V/2 | 0* | 0 | 0 | V | V | V | V |
| CP2 | (0) | 0 | 1 | 1 | 1 | 0 | 0 | 0 |
|     | V* | V/2 | 0 | 0 | 0 | V | V | V |
| CP3 | (0) | 0 | 0 | 1 | 1 | 1 | 0 | 0 |
|     | V | V* | V/2 | 0 | 0 | 0 | V | V |
| CP4 | (0) | 0 | 0 | 0 | 1 | 1 | 1 | 0 |
|     | V | V | V* | V/2 | 0 | 0 | 0 | V |
| CP5 | (0) | 0 | 0 | 0 | 0 | 1 | 1 | 1 |
|     | V | V | V | V* | V/2 | 0 | 0 | 0 |
| CP6 | (0) | 0 | 0 | 0 | 0 | 0 | 1 | 1 |
|     | V | V | V | V | V* | V/2 | 0 | 0 |
| CP7 | (0) | 0 | 0 | 0 | 0 | 0 | 0 | 1 |
|     | V | V | V | V | V | V* | V/2 | 0 |
| CP8 | (0) | 0 | 0 | 0 | 0 | 0 | 0 | 0 |
|     | V | V | V | V | V | V | V* | V/2 |

DEFLECTION CIRCUIT FOR A CATHODE RAY TUBE

BACKGROUND OF THE INVENTION

The present invention relates to a deflection circuit for a cathode ray display tube having a planar array of substantially rectangular, parallel electrodes which in cooperation with another spaced apart planar electrode defines a deflection zone. By providing a suitable voltage pattern on the parallel electrodes, the other planar electrode being at a substantially constant voltage, then an electron beam entering laterally into the deflection zone is defelected as desired towards the other planar electrode. Field scanning can be effected by suitably changing the voltage levels and pattern. The planar electrode may be the input electrode of a channel plate electron multiplier or an optically transparent electrode applied to the faceplate of a display tube.

DESCRIPTION OF THE RELATED ART

A flat display tube having a channel plate electron multiplier is disclosed in British Patent Specification No. 2101396. In the display tube disclosed in that specification orthogonal scanning of an electron beam is achieved by (1) electrostatic deflectors arranged adjacent the final anode of an electron gun and (2) a plurality of substantially parallel electrodes on a central planar divider which co-operate with an electrode on the input side of a channel plate electron multiplier. Although the specific description of the flat display tube in this specification refers to line scanning in the horizontal direction by the electrostatic deflectors and field scanning in the vertical direction by the array of planar electrodes, the display tube may be rotated through 90° so that the line scanning is vertical and the field scanning is horizontal. For convenience of description field/frame scanning will be taken to mean the lower of the two scanning speeds.

In a display tube having a field scanning deflection zone of the type described a potential difference of a predetermined polarity and magnitude between certain of the parallel electrodes and the planar electrode will cause an electron beam to turn towards the planar electrode. However if one or more adjacent parallel electrodes are at the same voltage as the planar electrode then a field free space is formed and an electron beam follows its trajectory undeflected. In general the voltage applied to each of the planar electrodes is such that at the beginning of each field scan it has to be at a first fixed voltage (e.g. 0V) and then at the required instant change at a predetermined rate, which is substantially identical for each electrode, until it reaches a second fixed voltage V (e.g. +400 V). Once at the second fixed voltage, which is the same as that on the planar electrode, it must remain constant until the end of the field period. In British Patent Specification No. 2101396 it is noted that the pattern of voltage changes from the first to the second voltage (V) is such that when one electrode has reached the mid-voltage (V/2) then the voltage applied to the adjacent parallel electrode is increased, and so on.

SUMMARY OF THE INVENTION

It is an object of the invention to effect field scanning in a way which is both effective and efficient in the sense of not consuming too much power.

According to one aspect of the present invention there is provided a deflection circuit for a cathode ray display tube having a planar array of substantially parallel, elongate electrodes, a coextensive planar electrode spaced from said array, means for producing an electron beam and introducing the electron beam into the space between the elongate electrodes and said planar electrode, each of the electrodes being individually addressable, said deflection circuit having a plurality of ramp voltage generating stages, each of said stages being coupled to a respective one of the elongate electrodes, said ramp voltage generating stages being adapted in response to a trigger signal to generate a ramp voltage from a first predetermined voltage to a second predetermined voltage and in response to reaching said second predetermined voltage producing a trigger signal to initiate the generation of a ramp voltage of the next required stage.

The present invention also relates to a cathode ray tube display system comprising a cathode ray tube including an envelope, a cathodoluminescent screen on a substantially planar surface, means for producing an electron beam, means for deflecting said electron beam orthogonally, said deflecting means including a planar array of substantially parallel, elongate electrodes, a coextensive planar electrode spaced from said array, means for introducing the electron beam into the space between the elongate electrodes and said planar electrode, a substantially constant voltage source coupled to the planar electrode and a deflection circuit made in accordance with the present invention coupled to the elongate electrodes.

If desired a channel plate electron multiplier may be disposed parallel to and coextensive with the screen, the planar electrode being provided on the input side of the channel plate electron multiplier.

BRIEF DESCRIPTION OF THE DRAWINGS

The present invention will now be described, by way of example, with reference to the accompanying drawings, wherein.

In the drawings corresponding reference numerals have been used to refer to the same parts.

DESCRIPTION OF THE PREFERRED EMBODIMENTS

Figure 1:
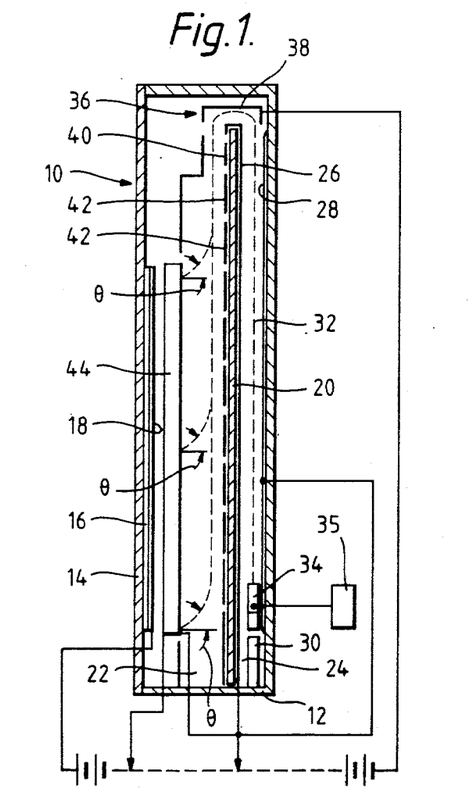
FIG. 1 is a diagrammatic cross section through a flat display tube and illustrates the main power supplies thereto.

In FIG. 1 the flat display tube 10 comprises an envelope 12 including an optically transparent, planar faceplate 14. On the inside of the faceplate 14 is a cathodoluminescent screen 16 with an electrode 18 thereon.

For convenience of description, the interior of the envelope 12 is divided in a plane parallel to the faceplate 14 by an internal partition or divider 20 to form a front portion 22 and a rear portion 24. The divider 20, which comprises an insulator such as glass, extends for substantially a major part of the height and width of the envelope 12. A planar electrode 26 extends over the exposed edge of the divider 20 and continues for a short distance down its front side. Another electrode 28 is provided on the inside surface of a rear wall of the envelope 12.

Means 30 for producing an upwardly directed electron beam 32 is provided in the rear portion 24 adjacent a lower edge of the envelope 12. The means 30 may be an electron gun of the hot or cold cathode type. An upwardly directed electrostatic beam deflector 34 is spaced by a short distance from the final anode of the electron beam producing means 30 and is arranged substantially coaxially thereof. If desired the beam deflector 34 may be electromagnetic.

At the upper end of the interior of the envelope 12 there is provided a reversing lens 36 comprising an inverted trough-like electrode 38 which is spaced above the upper edge of the divider 20. By maintaining a potential difference between the electrodes 26 and 38 the electron beam 32 is reversed in direction whilst continuing along the same angular path from the line deflector 34.

On the front side of the divider 20 there are provided a plurality of laterally elongate, vertically spaced electrodes of which the uppermost electrode 40 may be narrower and acts as a correction electrode as will be described later (see FIG. 2). The other electrodes 42 are selectively energised to provide field deflection of the electron beam 32 onto the input surface of an electron multiplier 44 which may be of a microchannel plate type or a laminated dynode type. A laminated dynode electron multiplier 44 and its operation is described in a number of published patent specifications of which British Patent Specifications Nos. 1,401,969, 1,434,053 and 2023332A are but a few examples. Accordingly the details of this type of electronmultiplier 44 will not be described in detail but for those not familiar with it, the electron multiplier comprises a stack of spaced apart, apertured mild steel plates held at progressively higher voltages. The apertures in the plates are aligned and contain a secondary emitting material. An electron striking the wall of an aperture in a first dynode produces a number of secondary electrons, each of which on impacting with the wall of an aperture in a second dynode produces more secondary electrons, and so on.

The stream of electrons leaving the final dynode are accelerated towards the screen 16 by an accelerating field being maintained between the output of the electron multiplier 44 and the electrode 18.

In the operation of the display tube to produce a television raster the following typical voltages are applied with reference to OV, which is the cathode potential of the electron gun 30. The electrodes 26, 28 in the rear portion 24 of the envelope 12 are at 400 V to define a field free space in which line deflection takes place with potential changes of about ±30 V applied to the beam deflectors 34 by a line deflection output stage 35. As the angular deflection of the electron beam continues after a reflection of 180° in the reversing lens 36 then the maximum angles need only be about ±20°. The trough-like electrode 38 of the reversing lens is at OV compared to the 400 V of the extension of the electrode 26 over the top edge of the divider 20. The input surface of the electron multiplier 44 is at 400 V whilst at the beginning of each field scan at least the upper electrodes 42 are at OV but are brought up to 400 V in a sequence to be described so that the electron beam 32 in the front portion 22 is initially deflected into the topmost apertures of the electron multiplier 44, subsequently the electrodes 42 are brought up to 400 V to form a field free space with the electron multiplier 44 in the vicinity of the next electrode 42 in the group to be at OV. The landing angles $\theta$ of the beam 32 are fairly constant over the input side of the electron multiplier, these angles being between 30° and 50°. A field deflection circuit 43 applies the required voltages to the respective electrodes 42. In the case of using a laminated plate electron multiplier the voltage across each dynode of the electron multiplier 44 is typically +300 V per stage although the precise voltage depends on the secondary emitter used and could be as high as 500 V. Thus for a 10 dynode multiplier the total potential difference is 3.0 kV which, allowing for the 400 V on the input side of the multiplier, means that the potential at the output side is equal to 3.4 kV. The electrode 18 is typically at a potential of 11 kV to form an accelerating field between the output side of the electron multiplier 44 and the screen 16.

In the case of the electron multiplier 44 being a microchannel plate electron multiplier then a potential difference of the order of 1 kV is applied between the input and output electrodes.

In order to be able to carry out a rectangular reaster scan across the input side of the electron multiplier 44 it is necessary to apply a trapezium type correction to the line scan amplitude so that the edges of the raster produced by the electron beam 32 follow say the vertical edge of the electron multiplier. The trapezium correction is applied dynamically to the beam deflector 34 by its line deflection output stage 35 to reduce the acute angle that the electron beam 32 makes with the vertical as the electron beam progresses line by line in the field direction. In the case of a 10 inch (25 cm) diagonal screen the typical scan angles for the top and bottom of the screen are ±20° and ±13°, respectively.

Figure 3:
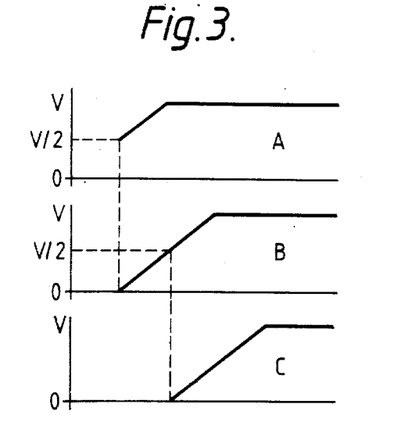

Referring to FIG. 3, the timing of the commencement of energisation of the electrodes 42 is chosen to suit the tube and its application. However for a television raster, experimental work so far suggests that a suitable timing cycle is to commence with the first of the field scanning electrodes 42 at V/2 (200 V in the present example) and the second of the electrodes 42 at 0 volts. Both electrodes are then energised so that their voltages increase linearly with time—see curves A and B. As curve A reaches V and curve B reaches V/2 then the next electrode 42 commences its energisation—see curve C. In consequence for the field scan the potentials of two adjacent electrodes contribute to the electrostatic field. To obtain a substantially linear scan with this form of energisation, it is necessary to choose the ratio of the width of the space 22 to the height of the electrodes 42 to be about 1.5:1. If for some reason a different ratio is required then a linear scan must be obtained by some other means. For example with a ratio of 2:1 the voltages on three adjacent electrodes can be varied in a linear manner. However depending on circumstances shaping the waveforms may be necessary. As is evident from the foregoing description the line and field scans are purely for the purposes of addressing the electron beam to the input side of the electron multiplier 44. Consequently the primary beam current can be small, typically less than 1 µA. However in order to obtain a good cross sectional shape for the incident beam an astigmatic electron gun 30 can be provided to complement the different horizontal and vertical focusing.

In the case of a 10 inch (25 cm) display tube no dynamic focusing corrections are needed but this may not be true for other sizes of display tubes.

The mean brightness of the display on the screen 16 is controlled by the electon beam current, the gain of the electron multiplier 44 and the potential on the final viewing screen. By using a low beam current the problems of the space charge effects on a low energy beam are avoided. However by using the electron multiplier the brightness can be made very high without adversely effecting on the spot size. Modulation of the electron beam current for the purposes of displaying visual brightness information is achieved by a signal applied to the grid of the electron gun.

Other refinements which may be incorporated into the display tube but which are not shown in the drawings include corrector plates for deflecting the path of the electron beam in a plane perpendicular to the screen as it leaves the electron beam producing means 30 but before it reaches the line deflector 34 in order to counter any misalignment of the electron beam producing means 30. One or more feeler electrodes may be provided on the rear side of the divider 20 to sense the position of the electron beam 32 as it scans arcuately across the electrode 38. In consequence a positional error in the scan can be sensed and appropriate correcting voltages applied to the corrector plates. This will ensure that the beam always enters the central part of the reversing lens.

In the embodiment shown in the drawings, the electron beam producing means 30 and line deflector 34 have been shown disposed at the lower end of the envelope 12 and the reversing lens 36 at the top end of envelope 12. However in an alternative, non-illustrated embodiment the beam producing means 30 and the line deflector 34 can be arranged at the top end of the envelope 12 with the reversing lens at the bottom end. In order to carry out field deflection it is necessary at the commencement of each scan to have all the electrodes 42 at 400 V to provide a field free space between them and the electron multiplier 44 and then to bring each electrode 42 in turn down to zero volts commencing at the top to deflect the electron beam 32 onto the input of the electron multiplier 44.

Figure 2:
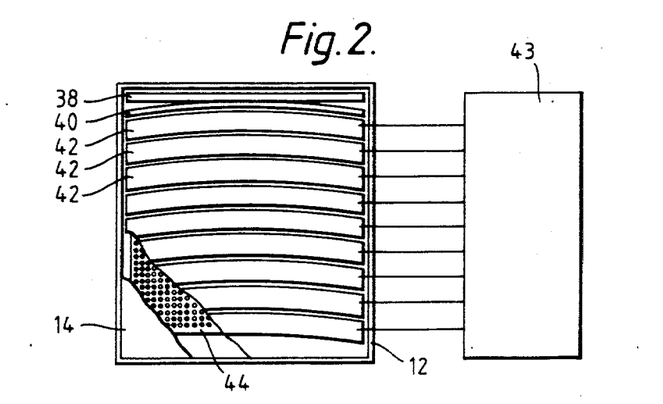
FIG. 2 is a diagrammatic view of the display tube shown in FIG. 1 with the faceplate and electron multiplier broken away to show the field deflection electrodes and the electrical connections thereto, FIG. 3 are waveform diagrams of one pattern of the voltages applied to successive field deflection electrodes.

In a further non-illustrated embodiment the display tube shown in FIGS. 1 and 2 can be rotated 90° so that the electrodes are generally vertical and the electron beam emerges from the electron beam producing means 30 in a generally horizontal direction.

In describing the operation of the field deflector circuit 43 it will be assumed that the pattern of voltages applied to the electrodes will be as shown in FIG. 3. However other voltage patterns may be adopted, for example with voltage ramps applied simultaneously to three of the electrodes 42 at any one time although each one commences at a different predetermined level.

Figure 4:
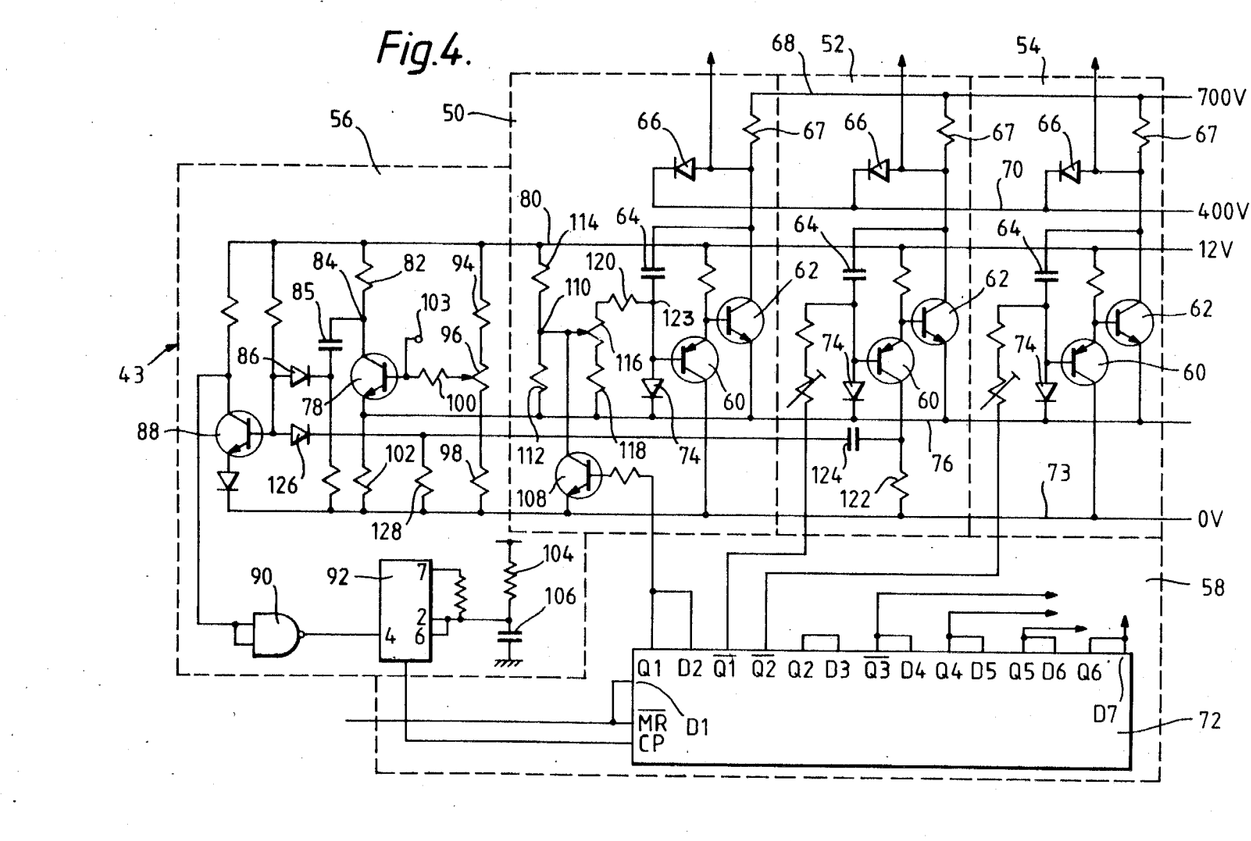
FIG. 4 is a schematic circuit diagram of one embodiment of the deflection circuit.

Referring to FIG. 4 the circuit 43 comprises a plurality of stages each one coupled to a respective one of the electrodes 42 in FIG. 2. The first stage 50 is a half-ramp stage which operates slightly differently compared to the second stage 52 and subsequent stages 54. The second stage 52 has slight constructional differences compared to the subsequent stages 54. However apart from the differences in the first and second stages 50, 52, the operation of all the stages is essentially the same. The circuit 43 further comprises a clock waveform generator and amplitude control stage 56 and a sequence control stage 58.

Before describing the circuit 43 in detail it is useful to refer to the performance requirements of this circuit. Referring to FIG. 1, two elctrostatic field conditions have to be produced, a first one to enable the electron beam to move downwards the desired distance into the space between the electrodes 42 and the electron multiplier 44, the beam path being parallel to both, and a second one, transverse to the beam path, to deflect the electron beam 32 onto the input side of the electron multiplier. The first field condition is established by creating a field free region between selected ones of the electrodes 42 and the input electrode of the electron multiplier 44. However since the space between electrodes 42 and the multiplier 44 is narrow then the drive voltage to the electrodes 42 must be held constant, typically within less than 1 volt, of the voltage applied to the input electrode of the multiplier otherwise the electron beam will deviate from its intended path. The second field condition is produced by providing a voltage difference between at least one of the electrodes 42 and the electron multiplier. Scanning of the beam landing point is achieved by making the voltage ramp-up from a low valve to a high value (or vice versa). The voltage ramp may be linear as shown in FIG. 3 or it may be varied non-linearly to suit a particular application. The voltage ramps of the stages 52 and 54 are substantially identical. Consequently the deflection circuit requires that each stage starts its ramp from a predefined level, the ramp must build-up at the required rate and its finishing voltage must be within 1 volt or less of the required level. Also it is necessary for another stage to commence its ramp at the termination of a previous ramp to ensure no change in the velocity of the landing point of the electron beam which changes are seen as brightness or scan linearity variations. In order to comply with these different requirements, each stage 52 and 54 produces a sharp ramp which unambiguously reaches its final voltage and in so doing produces a trigger signal for the next required stage.

In theory at the beginning of each field scan all but the first and perhaps the second stages are at zero volts and then each electrode 42 is ramped-up in turn. However maximum current drain occurs in the output stages when the electrodes are at zero volts rather than at their maximum voltage of say 400 V. In the circuit illustrated in FIG. 4 means are provided to maintain all the electrodes other than those involved in producing the transverse field conditions in the vicinity of the electron beam, at the maximum voltage.

Each ramp stage of the deflection circuit 43 comprises a Miller integrator circuit comprising a phase inverting compound transistor formed by PNP transistor 60, type BC559, whose emitter electrode is connected to the base electrode of an NPN transistor 62, type BUX87, a capacitor 64 connected between the base and collector circuits of the transistors 60, 62, respectively. The anode of a clamping diode 66 is connected to the junction of the collector of the transistor 62 together with a 2M2 resistor 67 which is connected to a 700 V supply rail 68. The anode of the diode is also connected to its associated electrode 42, whilst its cathode is connected to a 400 V rail 70. The Miller integrator is activated by a negative-going voltage step applied to the input circuit of the compound transistor via a suitable resistor from a shift register 72 which may comprise two or more shift registers type 40175 connected in tandem. The capacitor 64 is charged until the diode 66 becomes forward biased and clamps the associated electrode 42 to the 400 V rail. The sudden conduction of the diode 66 causes a change in the current flow such that it flows in the diode rather than in the compound transistor. This sudden change can be used to produce a trigger signal which, via the clock and shift register circuitry, instructs the next required stage in the system to commence generating a positive voltage ramp.

Alternative methods of developing a trigger signal are to detect the change in current flow in the compound transistor or to monitor the voltage at the base electrode of the transistor 62. An advantage of these alternative methods is that the signals are at a low level which is at the voltage of the other circuitry.

The collector electrode of the transistor 60 is connected to any suitable point such as the zero volt rail 73 whilst its base electrode is clamped when necessary, by a diode 74 to an internal voltage rail 76 of typically 3 V which is used as a reference voltage for the integrator circuitry. The internal reference voltage is derived from an emitter follower transistor 78. The collector electrode of the transistor 78 is coupled to a 12 volt rail 80 by way of a resistor 82. A junction 84 of the collector of the transistor 78 and the resistor 82 is used to derive a negative pulse which is applied via a capacitor 85 and a diode 86, type BAW 62, to the base electrode of an NPN transistor 88, type BC 548. The collector circuit of the transistor 88 is connected via a NAND circuit 90 which serves as a pulse shaping and inverting circuit to a triggerable clock oscillator based on a type 555 integrated circuit 92.

Reverting to the emitter follower transistor 78, the base circuit comprises a potential divider formed by a 8K2 resistor 94, a 2K2 potentiometer 96 and a 2K2 resistor 98 connected in series between the 12 V rail 80 and the zero volt rail 73. A wiper of the potentiometer 96 is connected by way of a 15K resistor 100 to the base electrode of the transistor 78. Adjusting the wiper provides a simple means of changing simultaneously the gradients of the ramps produced by the stages 50, 52 and 54. The base bias derived from the potentiometer 96 acts as a reference voltage which enables a substantially constant voltage difference of 3 V to be established across the 1K5 emitter resistor 102. Thus the rail 76 is at a potential of 3 V positive relative to the rail 73.

If it is necessary to provide an additional linearity correction to the ramp voltages this can be applied to the base electrode of the transistor 78 by means of an input 103.

As a capacitor 64 is charged-up and the compound transistor 60, 62 is cut-off due to the forward biasing of the associated diode 66, the current change produced will cause a complementary change in the emitter current of the transistor 78, the current change causing a pulse to be produced at the junction 84. As mentioned earlier this pulse after shaping is applied to the reset input 4 of the clock integrated circuit 92. The period of the clock is determined by the RC circuit 104, 106 and is comparable to that of a complete integrator output ramp. Consequently if no reset pulse is received on input 4, then after a predetermined period of time the oscillator will generate its own output signal to initiate the generation of the ramp voltages. This output signal, however generated, is applied to the clock input CP of the shift register 72 which may be a single large shift register (as shown) or a plurality of shift registers connected in tandem. The Q1 output drives a mono-directional voltage clamp transistor 108 whose collector is connected to the input of the first stage 50 whereas the inverting outputs $\overline{Q1}$, $\overline{Q2}$, $\overline{Q3}$ and then the outputs Q4, Q5 are connected to the stages 52 and 54.

The reason for using shift register(s) in the sequence control stage 58 will be explained with reference to FIGS. 3 and 5. In the example given of a ramp voltage of one electrode being started when the ramp voltage of the preceding electrode has reached V/2 and the ramp voltage of the electrode preceding that having reached V, then at any one time only two electrodes are actually receiving ramp voltages which alter the transverse electrostatic field causing the beam to be deflected towards the input of the electron multiplier 44. Beyond the deflection area, it is irrelevant as to what are the field conditions. Since it is more economical on current consumption to have the electrodes at V (400 V) rather than 0 V because the transistors 60, 62 are non-conductive, then as scanning takes place it is necessary to bring the electrode which is about to participate in the beam deflection to zero volts in readiness for the generation of the ramp voltage. It may be shown that the required electron trajectory is obtained provided that at least the two stages following the two active stages are at 0 V. Therefore each stage is commanded to ramp down to 0 V typically 3 clock periods before ramping upwards.

Figure 5:
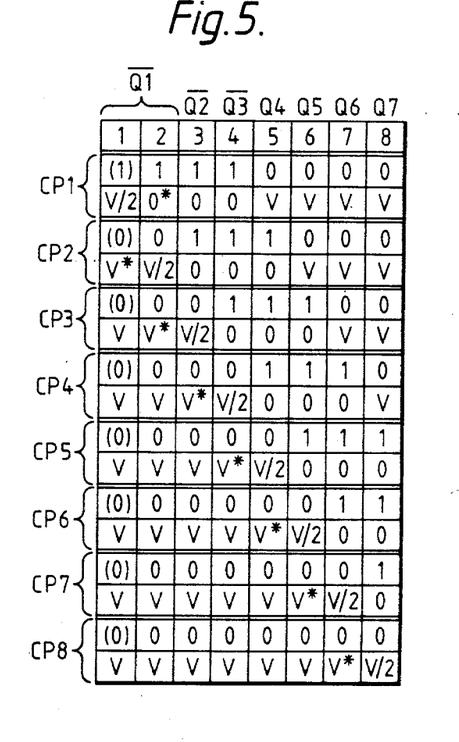
FIG. 5 is a tabular summary showing the binary data stored in the shift register at different successive instances and the consequented ramping down and up of the deflection voltage to each electrode.

Referring to FIG. 5 the top row denotes the shift register 72 stage and the next row the number of the integrator stage. The pairs of rows identified by CP relate to the situation after successive clock pulses and the upper row of each pair denotes the shift register outputs and the lower row the integrator output voltages at the end of the particular clock pulse cycle, that is, just before the next clock pulse arrives. The asterisk (*) denotes the condition which generates the next clock pulse.

In order to enable the voltages on the electrodes 42 to be cycled as described and assuming for example that there are eight electrodes 42, a binary sequence 11100000 is loaded into the shift register and is shifted right one stage in response to each clock pulse.

This pattern is achieved by using the "master reset" input of the integrated circuit(s) to clear all the internal latches, and using the appropriate combination of Q and $\overline{Q}$ (inverted Q) outputs to drive the integrator stages. In the above binary sequence, a "1" means that a shift register output is at 12 volts (i.e. the supply voltage), causing the associated electrode voltage to be ramped down and then held near 0 V, and a "0" means that the shift register output is at 0 V, and a "0" means that the shift register output is at 0 V causing the electrode voltage the ramp up and then be held at 400 V.

During the field "flyback" period, the binary sequence is 111 00000 (CP1 in FIG. 5) which causes the first, second, third and fourth stages ramp down towards 0 V. When the voltage at the output of integrator stage 2 nearly reaches 0 V, the output transistor 62 saturates and the input transistor 60 turns off. This produces a negative voltage step at the junction of resistor 122 and the collector of the transistor 60. This step is coupled via the capacitor 124 and diode 126 to the clock pulse detector transistor 88. The clock pulse changes the shift register pattern to 01110000 (CP2 in FIG. 5) which is the start of the field scan period. Since the 2nd, 3rd and 4th stages are substantially identical, the output voltages of the 3rd and 4th stages will also be close to 0 V but because of differences in the first stage 50, to be described later, this output will be at about V/2 volts. This is necessary to obtain the correct electrostatic deflection field at the top of the electrode array. With this new binary sequence the first and second stages now ramp upwards and the fifth stage ramps downwards and reaches nearly 0 V.

The change over from CP2 to CP3 occurs when the first stage output reaches V this producing a rapid current change in diode 66, transistors 62 and 78 and resistor 82. This produces a voltage step at the junction of resistor 82 and the collector of transistor 78 which is coupled by the capacitor 85 and diode 86 to the clock detector transistor 88. At each shift a "0" is loaded into the first register stage so that as the scan progresses all the early stages remain in their "high" state thus providing the field-free region for the transit of the electron beam.

The process continues with a new clock pulse being generated each time an output stage reaches V until the shift register reaches the final code 0000 0000 or until a "master reset" is brought about by an externally applied synchronising pulse, at which time the whole cycle repeats.

Because the ramps from stages 1 and 2 are required to start at the same time they are both driven from the first stage of the shift register 72. However in the first stage transistor 108 is used as a monodirectional voltage clamp but as it also produces an inverting action it is driven from the $\overline{Q1}$ rather than the Q1 (inverted output).

Figure 6:
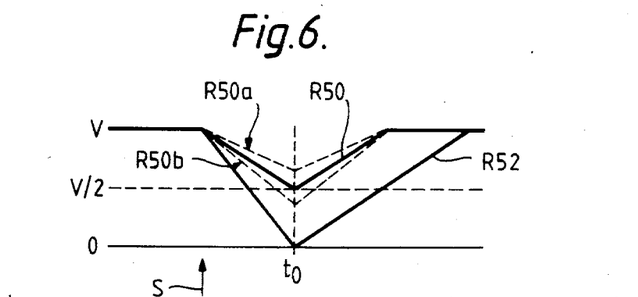
FIG. 6 shows the ramp voltages of the first and second stages of the deflection circuit.

The first stage 50 of the deflection circuit is different from the other stages 52, 54, because at the beginning of a field scan it has to initiate its ramp from V/2 simultaneously with the stage 52 initiating its ramp from zero volts as shown in FIG. 6. The collector of the transistor 108 is connected to a tap 110 of a resistive potential divider formed by resistors 112 (27K$\Omega$) and 114 (15K$\Omega$) connected in series between the rails 76 and 80. The tap 110 is connected to the wiper of a potentiometer 116 (47K$\Omega$) which is connected in series between resistors 118 (47K$\Omega$) and 120 (47K$\Omega$). The other side of the resistor 118 is connected to the rail 76 whilst the other side of the resistor 120 is connected to a junction 123 of the capacitor 64, the diode 74 and the base of the transistor 60.

In operation, when the transistor 108 is non-conductive, the potential at the tap 110 goes to a voltage effectively mid-way between rails 76 and 80, so that at the occurrence of a sync pulse denoting the flyback period the stage ramps down (R50) at half the rate of the second stage (R52) which is effectively driven from rail 80 (via the shift register output stage which itself operates from the rail 80). When the transistor 108 is rendered conductive, the voltage applied to the wiper of potentiometer 116 is pulled to 0 V, the capacitor 64 charges and the output voltage applied to the associated electrode 42 ramps up at the same rate as stage 2. The slopes of the down and up ramps are proportional to the resistance between the wiper of the potentiometer 116 and the base of transistor 60. Hence adjustment of the wiper can provide a family of ramps R50a, R50b as shown in broken lines. The resistor 118 enables the apparent impedance loading the divider resistors 112 and 114 to remain substantially constant when the potentiometer 116 is adjusted. This adjustment of the wiper of the potentiometer 116 enables minor distortions of the deflection field close to the trough-like electrode 38 (FIG. 1) to be compensated.

Although the Miller integrating circuit has been described as having complementary transistors 60, 62, other arrangements may be used such as a cascode or an operational amplifier or a combination of bipolar and field effect transistors. When bipolar transistors are used it is preferable to have at least two stages of current gain to give good ramp linearity. In general it is preferable to provide at least a bipolar transistor input stage to give good accuracy of input offset voltage.

Figure 7A:
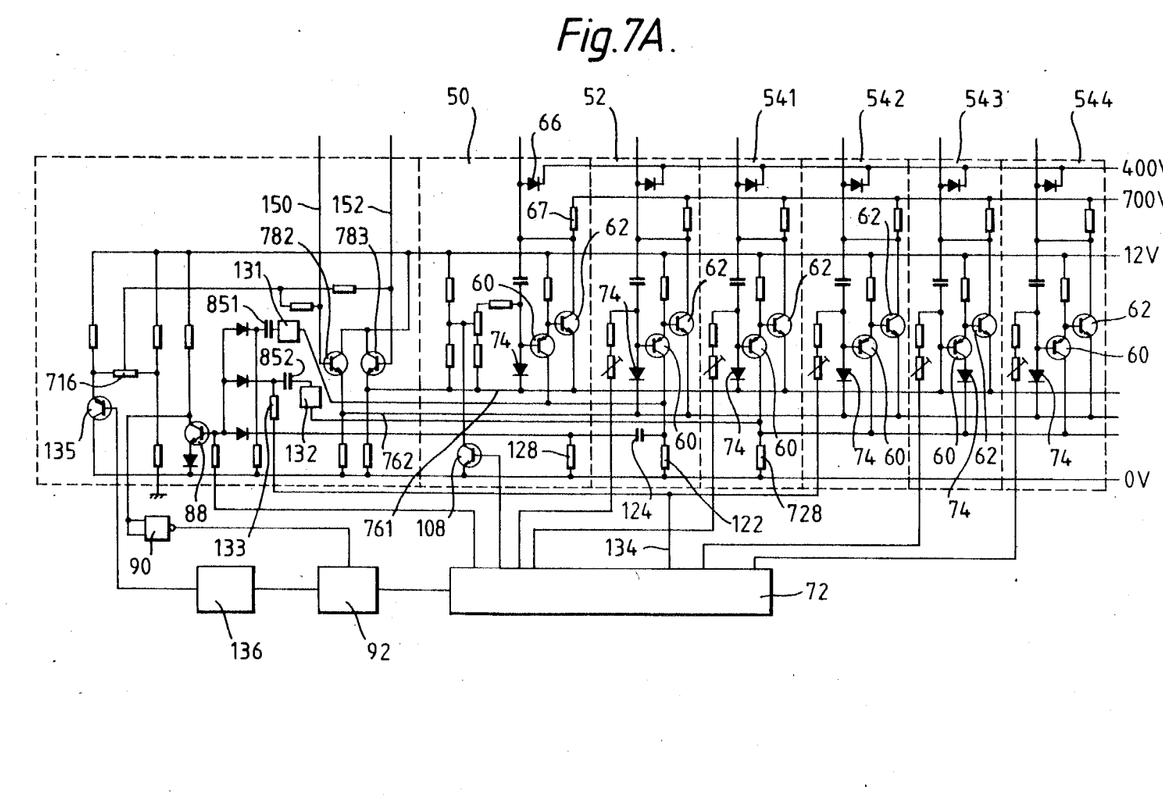
FIG. 7A is a circuit diagram partially in block form of a modified embodiment of the deflection circuit made in accordance with the present invention.

FIG. 7A shows an embodiment of the invention in which the stages 50, 52, 541, 542, 543, 544 and so on are formed into two chains so that one chain comprises the odd numbered stages and the other chain the even numbered stages. The even and odd numbered chains are connected respectively to the emitter circuits of NPN transistors 782, 783. The purpose of doing this is to enable some common external control to be provided to ensure that the overlapping and interleaving of the ramp voltages, FIG. 3, is uniform and also to enable all the ramp gradients to be adjusted simultaneously. This is possible because during scan there will be one, and only one integrator stage active in each chain so the two control inputs 150 and 152 coupled respectively to the base electrodes of the transistors 782, 783 each have control of the ramp gradient of one of the active stages.

In this implementation the clock trigger pulses are derived from the collectors of the integrator input transistors 60. These collector connections are also arranged in two groups, the first two stages 50, 52 are connected to a first current-detecting resistor 122 and the remaining stages to a second current-detecting resistor 728. The reason for this is that it is important that after the shift register 72 has been reset by a synchronising pulse, the clocking of the shift register should only be brought about by the appropriate threshold voltages being attained in the first and second stages, and not by events occurring in other stages. Therefore the circuit is arranged such that the current transients in the first and second stages may be detected by a pulse amplifier circuit 131, which is shown in greater detail in FIG. 7B, and applied to the clock detector transistor 88 at any time but that similar transients in other stages are detected by pulse amplifier circuit 132, which is shown in greater detail in FIG. 7B but may be blocked by a positive voltage from the shift register 72 via resistor 133 when this is necessary. At event CP4 the $\overline{Q3}$ shift register output 134 becomes 0 V and then allows clock signals from later stages to pass from the pulse amplifier circuit 132 through to transistor 88.

Figure 7B:
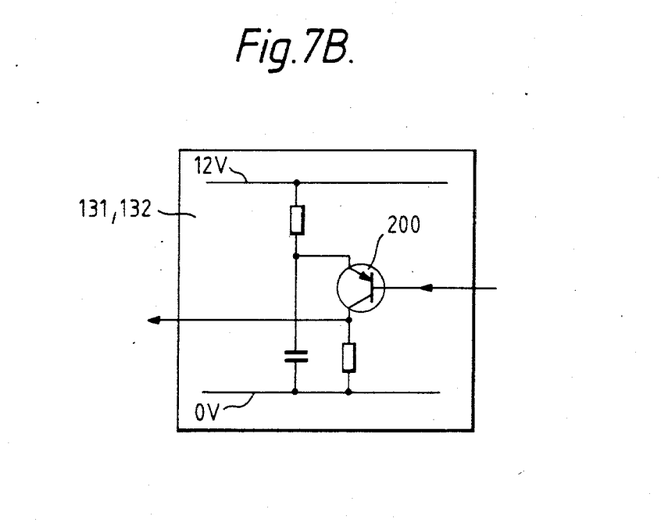
FIG. 7B is a circuit diagram of the amplifier circuits 131, 132 shown in FIG. 7A, and, FIG. 8 is a circuit diagram, with waveform diagrams, of a linearity correction circuit.

FIG. 7B shows the circuit of the pulse amplifiers 131, 132 which comprises a PNP transistor 200 connected as an a.c. inverting amplifier circuit. The output of each pulse amplifier is applied respectively to a capacitor 851, 852 which may form part of a pulse plus bias gate.

Figure 8:
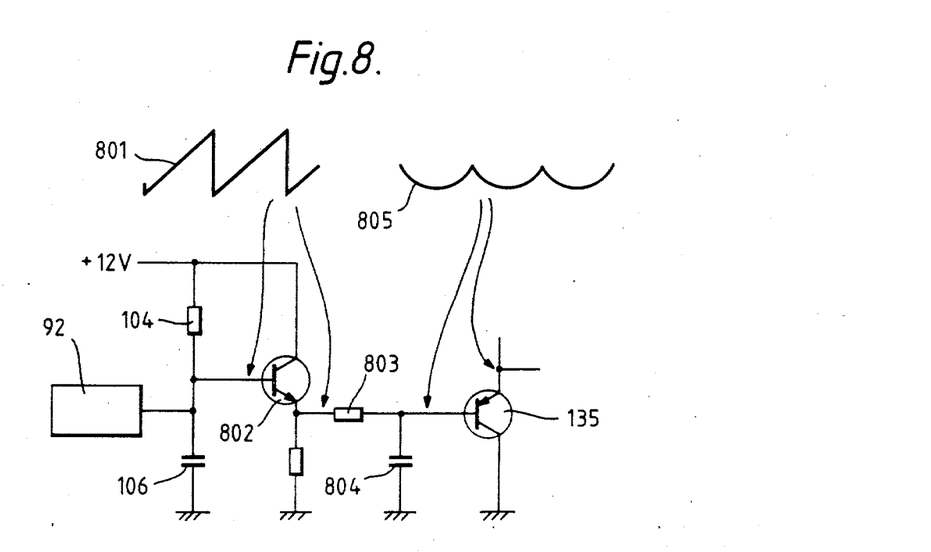

A further feature of the implementation of FIG. 7A is the generation of a linearity-correctin signal from the clock-oscillator circuit 92 which signal is shaped by shaper 136 and applied to the scan-velocity potentiometer 716 via a transistor 135. A simple arrangement is shown in FIG. 8 with typical waveforms.

It can be shown that with linear voltage ramps applied to the field deflection electrodes the field scanning velocity waveform contains a cyclical parabolic component, each cusp corresponding to the time when a change-over occurs between integrator stages, which event corresponds to a system clock pulse.

In operation the clock generator 92 produces a sawtooth ramp waveform 801 which is buffered by an emitter follower transistor 802 and then integrated by the passive circuit comprising a resistor 803 and capacitor 804 to produce a parabolic-type waveform 805 of significantly smaller amplitude (say 5 to 1 to 10:1 on peak to peak amplitude) than the ramp waveform 801. The waveform when applied to the scan-velocity control potentiometer 716 via emitter follower transistor 135 has the effect of improving the linearity of the movement of the electron beam across the display screen.

I claim:

1. A deflection circuit for a cathode ray display tube having a planar array of substantially parallel, elongate electrodes (42), a coextensive planar electrode (44) spaced from said array, means for producing an electron beam and introducing the electron beam into the space (22) between the elongate electrodes and said planar electrode, each of the elongate electrodes being individually addressable; said deflection circuit comprising: a series of ramp voltage generating stages, each of said stages having an output coupled to a respective one of the elongate electrodes; each of said ramp voltage generating stages being adapted, in response to a trigger signal applied thereto, to generate at its output a ramp voltage from a first predetermined voltage level to a second predetermined voltage level, and upon reaching said second predetermined voltage level to generate a trigger signal which initiates generation of a ramp voltage by the next stage.

2. A circuit as claimed in claim 1, wherein each ramp stage comprises a Miller integrator circuit a clamping diode connected between an output of the integrator circuit and a voltage rail at substantially said second predetermined voltage, the diode being rendered conductive in response to the ramp voltage reaching a voltage above that of the voltage rail.

3. A circuit as claimed in claim 2, wherein each Miller integrator circuit has a non-inverting input circuit, and further comprising an emitter follower transistor amplifier coupled to said non-inverting input circuits, a base electrode of the emitter follower transistor amplifier being coupled to means for varying the gradient of the ramp voltages of all said stages.

4. A circuit as claimed in claim 3, wherein a source of alternating voltage is connected to the base electrode of said emitter follower transistor amplifier to control the integration rate and therby modify the shape of the ramp voltage.

5. A circuit as claimed in claim 2, wherein the trigger signal is derived in response to the conduction of the associated clamping diode.

6. A circuit as claimed in claim 2, wherein the trigger signal is derived in response to the change in current flow in the Miller integrator circuit in response to its associated clamping diode being conductive.

7. A circuit as claimed in claim 2, wherein the trigger signal is derived in response to a change in the voltage at an input to each integrator circuit in response to its associated clamping catching diode being conductive.

8. A circuit as claimed in claim 3, wherein the trigger signal is derived from the collector circuit of the emitter follower transistor amplifier.

9. A circuit as claimed in claim 1, wherein a first of said ramp voltage generating stages produces a ramp voltage commencing at a third predetermined voltage, level which is intermediate the first and second predetermined voltage levels.

10. A circuit as claimed in claim 9, wherein the first of said ramp voltage generating stages comprises means for adjusting the starting point and the gradient of the ramp voltage of said first stage.

11. A circuit as claimed in claim 9, wherein the first and a second ramp voltage generating stages are triggered simultaneously.

12. A circuit as claimed in claim 1, wherein means are provided for causing each of said ramp voltage generating stages to ramp from its second predetermined voltage level to its first predetermined voltage level a predetermined time prior to receipt of the trigger signal for that stage.

13. A circuit as claimed in claim 12, further comprising a shift register having outputs connected to each of the ramp voltage generating stages, the shift register storing a predetermined pattern of binary data, said shift register being clocked in response to the trigger signals produced by said stages.

14. A circuit as claimed in claim 13, further comprising a triggerable oscillator for providing clock signals to the shift register, said oscillator having a period greater than the period between successive trigger pulses.

15. A circuit as claimed in claim 1, wherein the ramp voltage generating stages are arranged in n interleaved groups, where n is at least 2 and corresponds to the number of stages active at any one time, said stages being allocated serially to each group in turn, and wherein means are provided for monitoring the triggering of the stages and for correcting the timing of each group relative to the other(s) or to an auxiliary reference, by varying a control voltage applied to an input of the associated group.

16. A circuit as claimed in claim 1, further comprising means for generating a linearity correction signal for improving the linearity of movement of the landing point of the electron beam on said planar electrode.

17. A cathode ray tube display system comprising a cathode ray tube including an envelope (12), a cathodoluminescent screen (16) aon a substantially planar surface, means (30) for producing an electron beam, means (34, 35, 42) for deflecting said electron beam orthogonally, said deflecting means including a planar array of substantially parallel, elongate electrodes (42), a coextensive planar electrode (44) spaced from said array, means for introducing the electron beam into the space between the elongate electrodes and said planar electrode, a substantially constant voltage source coupled to the planar electrode, and a deflection circuit having a plurality of ramp voltage generating stages respectively coupled to the elongate electrodes, said ramp voltage generating stages being adapted in response to a trigger signal to generate a ramp voltage from a first predetermined voltage to a second predetermined voltage producing a trigger signal to initiate the generation of a ramp voltage by the next ramp stage.

18. A display system as claimed in claim 17, wherein an electron multiplier is disposed parallel to and coextensive with the screen and wherein the planar electrode is on the input side of the electron multiplier.

* * * * *